United States Patent
Dominguez et al.

(10) Patent No.: US 9,963,123 B2
(45) Date of Patent: May 8, 2018

(54) FRAME MOUNTED VEHICLE LIFT SYSTEM AND METHOD OF USE

(71) Applicants: Carlos Dominguez, Chandler, AZ (US); Eduardo Dominguez, Chandler, AZ (US)

(72) Inventors: Carlos Dominguez, Chandler, AZ (US); Eduardo Dominguez, Chandler, AZ (US)

( * ) Notice: Subject to any disclaimer, the term of this patent is extended or adjusted under 35 U.S.C. 154(b) by 0 days. days.

(21) Appl. No.: 14/678,490

(22) Filed: Apr. 3, 2015

(65) Prior Publication Data

US 2016/0288776 A1   Oct. 6, 2016

(51) Int. Cl.
| B62D 43/00 | (2006.01) |
| B60S 9/06 | (2006.01) |
| B60S 9/04 | (2006.01) |
| B60S 9/12 | (2006.01) |
| B62D 43/04 | (2006.01) |

(52) U.S. Cl.
CPC . *B60S 9/06* (2013.01); *B60S 9/04* (2013.01); *B60S 9/12* (2013.01); *B62D 43/002* (2013.01); *B62D 43/04* (2013.01)

(58) Field of Classification Search
CPC .......................................... B62D 43/00–43/10
See application file for complete search history.

(56) References Cited

U.S. PATENT DOCUMENTS

| 2,028,945 A | * | 1/1936 | Morrison | B60R 19/26 224/490 |
| 2,063,092 A | * | 12/1936 | Groden | B62D 43/10 296/37.2 |
| 2,063,598 A | * | 12/1936 | Franklin | B62D 43/08 224/42.13 |
| 2,547,083 A | * | 4/1951 | Lundgren | B62D 43/10 224/496 |
| 3,485,399 A | * | 12/1969 | Hebnes | B62D 43/04 414/466 |
| 4,047,629 A | * | 9/1977 | Klein | B62D 43/002 224/42.21 |
| 4,072,258 A | | 2/1978 | Cruson | |
| 4,278,191 A | * | 7/1981 | Mecham | B62D 43/002 224/42.21 |
| 4,428,513 A | * | 1/1984 | Delmastro | B62D 43/04 224/42.21 |
| 4,573,855 A | * | 3/1986 | Braswell | B62D 43/04 224/42.23 |
| 4,708,355 A | * | 11/1987 | Tiede | B60R 3/02 182/89 |

(Continued)

*Primary Examiner* — Joseph J Hail
*Assistant Examiner* — Tyrone V Hall, Jr.
(74) *Attorney, Agent, or Firm* — Schmeiser, Olsen & Watts, LLP

(57) ABSTRACT

A frame mounted vehicle lift system and method of use are described. The system and method of use are designed to provide a simple, reliable, and safe means for persons operating a motor vehicle to elevate one or more of the vehicle's wheels from the ground for a variety of purposes, such as changing a flat tire, for example. The system comprises one or more frame-mounted vehicle jacks and an automatic spare tire dispenser. Components of the invention are driven by actuators powered by the vehicle's battery and activated by a dashboard or other switch on the vehicle, or remotely by a FOB.

4 Claims, 8 Drawing Sheets

(56) References Cited

U.S. PATENT DOCUMENTS

| | | | | |
|---|---|---|---|---|
| 4,711,382 A | * | 12/1987 | Helterbrand | B62D 43/04 224/42.12 |
| 5,197,641 A | * | 3/1993 | Montgomery, Jr. | B62D 43/002 224/42.21 |
| 5,238,358 A | * | 8/1993 | Higgins | B62D 43/045 224/42.21 |
| 5,747,896 A | * | 5/1998 | Nagai | B23Q 1/017 310/20 |
| 5,993,133 A | * | 11/1999 | Murray | B62D 43/045 224/42.12 |

* cited by examiner

FRAME MOUNTED VEHICLE LIFT SYSTEM AND METHOD OF USE

BACKGROUND OF THE INVENTION

Technical Field

This invention relates to vehicle jacks and similar methods for raising vehicle wheels from the ground. Specifically, the invention relates to an frame mounted vehicle lift system and method of use.

State of the Art

Jacks are devices used to lift heavy objects, particularly motor vehicles. In order to change a flat tire, the wheel of the motor vehicle must be raised off the ground so that the flat can be changed. In other circumstances, a jack is used when the underside of the vehicle must be accessed for inspection or repair. Ever since motor vehicles came into widespread use in the early twentieth century, vehicle drivers have used mechanical devices to elevate the vehicle off the ground for emergency roadside repairs, such as changing a flat tire.

Motor vehicles are sold with a spare tire/wheel assembly and a mechanical, hand-operated jack. Use of a standard hand-operated mechanical jack, however, is cumbersome, requires user knowledge of proper placement beneath the vehicle frame, requires some degree of strength and physical skill by the user, and is dangerous even when properly performed because the jack may become dislodged while supporting the weight of the vehicle, causing the vehicle to fall and seriously injure or kill the user. Typically, the jack must be removed from its storage compartment in the vehicle and positioned at the proper point below the vehicle frame or wheel axle prior to use. The jack must be positioned safely on the ground beneath the vehicle frame and requires a stable surface which can bear a portion of the vehicle's weight without the jack easily becoming dislodged. The user must then activate the jack with a lever, such as a tire-iron or a wrench-type device, to elevate the vehicle. This process requires some degree of strength and effort by the user. When a flat tire is being changed, the user must retrieve the replacement from the vehicles spare tire storage compartment. In some cases, such as with many pick-up truck models, this process requires lowering the spare from its storage compartment beneath the vehicle and lifting the spare free from its storage mounting while in an awkward position. Finally, this entire activity is often performed in inclement weather conditions and/or at night, creating additional difficulty and safety issues for each step of the process.

Thus, elevating a disabled vehicle to change a flat tire on the roadside is often a difficult and potentially dangerous procedure requiring multiple steps. Retrieving a spare tire, particularly in many pick-up truck models, is cumbersome and awkward. Accordingly, a system is needed to facilitate lifting a vehicle at the roadside and retrieving a spare tire which is relatively easy and safe, reduces the number of steps required, and which requires only minimal user strength and knowledge.

SUMMARY OF EMBODIMENTS

The present invention discloses a frame mounted vehicle jack and method of use.

Disclosed is a frame mounted vehicle lift system comprising a jack coupled to a vehicle frame; a jack actuator mechanically coupled to the jack; and a power source electrically coupled to the jack actuator.

In some embodiments, the jack is coupled to the vehicle frame by a weld. In some embodiments, the jack is coupled to the vehicle frame by a fastener. In some embodiments, the frame mounted vehicle lift system further comprises a plurality of jacks. In some embodiments, the frame mounted vehicle lift system further comprises a lift plate coupled to the jack on a pivoting mount, wherein the lift plate may move in relation to the jack in response to contacting a surface. In some embodiments, the frame mounted vehicle lift system further comprises a jack actuator switch electrically coupled to the jack actuator. In some embodiments, the jack actuator switch is located on a vehicle dashboard. In some embodiments, the frame the jack actuator switch is a frequency operated button. In some embodiments, the frame mounted vehicle lift system further comprises a slide tire dispenser comprising a dispenser frame coupled to a vehicle a tire mount coupled to the dispenser frame; and a first slide actuator operatively coupled to the dispenser frame. In some embodiment, the frame mounted vehicle lift system further comprises a first actuator switch, wherein the first actuator switch activates the first slide actuator causing the dispenser frame to move in a direction away from the first slide actuator. In some embodiments, the frame mounted vehicle lift system further comprises a second slide actuator operatively coupled to the tire mount; and a second slide actuator switch electrically coupled to the second slide actuator, wherein the second slide actuator switch causes the second slide actuator to move the tire mount in a direction away from the dispenser frame.

Disclosed is a slide tire dispenser comprising a dispenser frame coupled to a vehicle; a tire mount coupled to the dispenser frame; and a first slide actuator operatively coupled to the dispenser frame.

In some embodiments, the first slide actuator causes a rearward displacement of a spare tire coupled to the tire mount. In some embodiments, the first slide actuator is operatively coupled to the dispenser frame by a first slide bar, and wherein activation of the first slide actuator causes the first slide bar to move in a linear direction away from the first slide actuator; and a joint pivotally coupling the dispenser frame to the vehicle, wherein activation of the first slide actuator causes the dispenser frame to pivot at the joint in response to the first slide actuator acting upon the dispenser frame through the first slide bar. In some embodiments, the slide tire dispenser further comprises a second slide actuator operatively coupled to the dispenser frame and the tire mount, wherein the second slide actuator causes the tire mount to move in a direction away from the dispenser frame.

Disclosed is a method of changing a vehicle wheel comprising the steps of activating an frame mounted vehicle lift system to cause elevation of a vehicle wheel off the ground; replacing the vehicle wheel on a wheel hub; and lowering of the vehicle wheel onto the ground by activating the frame mounted vehicle lift system.

In some embodiments, the method further comprises a step activating a slide tire dispenser to cause movement of a replacement wheel mounted thereon in a direction away from the vehicle. In some embodiments, the method further comprises removing a spare tire from the slide tire dispenser.

Disclosed is a method of deterring vehicle theft comprising activating a frame mounted vehicle lift system to cause elevation of four vehicle wheels off the ground.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
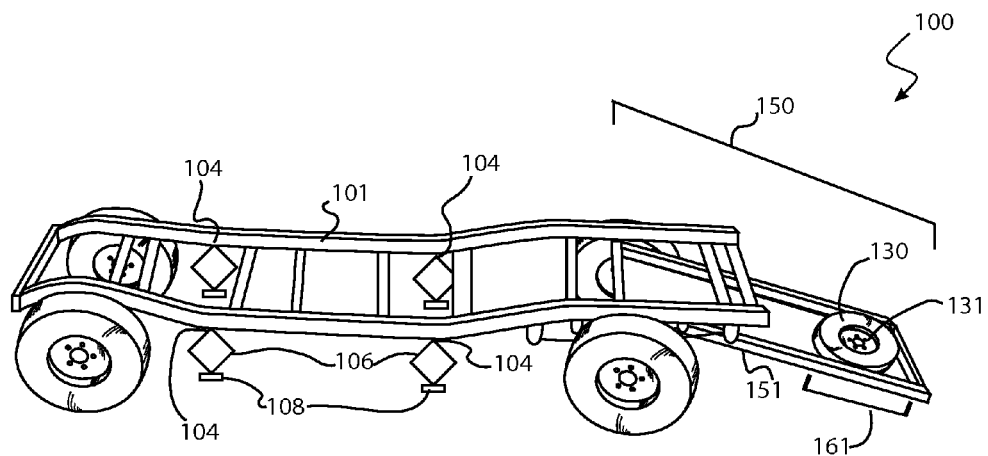
FIG. 1 is a perspective view of a frame mounted vehicle lift system 100 including a spare tire dispenser 150.

Changing a flat tire on the roadside is an activity that probably no one enjoys. A jack is necessary to raise the vehicle's wheel from the ground to allow removal and replacement with a spare tire/wheel. Usually, a jack is provided with the vehicle and stored in its designated compartment, such as in the trunk or with the spare tire/wheel.

Use of this standard jack, however, presents potential problems. If the jack is not replaced following use, however, it can become separated from the vehicle and unavailable when it is needed to change a flat or perform other repairs. To minimize the chance of damage to the vehicle and/or injury to the operator, the jack must be positioned at the proper location, or "jack point" beneath the vehicle frame and activated to extend and engage at the jack point. Proper jack placement may not be straightforward, however, particularly when the jack is being used by one who has little or no experience with making driveway or roadside vehicle repairs. The jack must support a portion of the vehicle weight, usually greater than five hundred pounds. The base of the jack, therefore, must rest upon as level and hard a surface possible so as to minimize the chance the base will shift beneath the vehicle while supporting the vehicle's weight, endangering the user. Additionally, the jack must be extended to raise the vehicle. Extending a loaded jack requires a certain level of strength and degree of physical exertion. These various factors all create potential obstacles to safe and proper jack use. Add stressful traffic noise, improper clothing, inclement weather, reduced visibility at night, and a myriad of other environmental factors and the use of a portable jack typically provided with a vehicle is, arguably, a complicated and potentially dangerous activity.

It is well documented that improper jack placement with respect to either the ground or the vehicle frame may result in injury. The National Highway Traffic Safety Administration issued a Research Note in September of 1998, estimating based upon extrapolation of a data set collected from multiple hospital emergency department visits, that in a one-year period from November of 1994 through October of 1995, around 4,822 persons nationwide were injured as a result of jack failures, sometimes seriously. The most common cause of jack failure—resulting in 74% of the injuries—occurred when either the jack slipped on the ground while loaded or the vehicle slipped on the jack.

Existing portable jacks, which are carried in the motor vehicle and available for changing flat tires and other emergency roadside repairs, are, therefore, 1) often awkward to use; 2) require certain knowledge, strength and skill; 3) may become lost or otherwise separated from the vehicle wherein the jack is not available when needed; and 4) misuse may injure the user.

When changing a flat tire, jacking-up the motor vehicle is not the only physically challenging and awkward activity required to change a flat tire at the roadside. The spare tire/wheel assembly must be retrieved from its storage bay within the vehicle. In a passenger car, the spare-tire storage is usually in the trunk, below a removably trunk floor panel. After removing the panel, which first requires unloading any items present in the trunk, he spare must then be lifted clear of the trunk compartment and lowered to the ground. In pick-up trucks and sport utility vehicles, the spare-tire storage is often in a compartment underneath the rear of the vehicle. In these and other such examples, the spare is suspended on a bracket coupled to a steel cable which is wound around a retaining roller. A fitting within or beneath the rear bumper is used to engage a jack handle or similar device by which the user turns the roller, unwinding the cable and lowering the spare from its storage compartment beneath the vehicle. The user must then kneel on the ground or recline beneath the spare to remove the spare from the bracket. This procedure is universally awkward and often difficult for even a skilled user to perform.

Accordingly, a vehicle lift system is needed which has a jack that cannot be separated from the vehicle, cannot engage the vehicle frame at an improper jack point, cannot be dislodged from the vehicle frame when in use whether by improper jack point placement or jack base placement on an unstable surface, and minimizes the need for physical strength, knowledge, and skill by the user. Also, a means to facilitate retrieval of the spare tire from certain classed of vehicles, such as pick-up trucks and sport utility vehicles, is needed.

The frame mounted vehicle lift system is designed to facilitate the safe roadside changing of a vehicle flat tire and may include a spare tire dispenser for use in some vehicle models. The lift system also provides a substantial degree of theft protection. Embodiments of the invention include a jack that is coupled to a strategic "jack point" on the vehicle frame relative to a wheel-hub position. This design allows each wheel to be elevated individually or in combination of two or all four simultaneously, depending upon how many jacks the user chooses to activate. Each jack comprises a jack actuator with a 3,000 to 5,000 pound lift capacity, in some embodiments. An electric switch selector controls each of the jack actuators from the vehicle instrument panel and/or key-fob. In some embodiments, a safety design is provided to operate the frame mounted vehicle lift system only when the vehicle is parked. In some embodiments, a leveling sensor is used to coordinate operation of a plurality of jacks to keep the vehicle substantially level when raising a portion of or the entire vehicle. The frame mounted vehicle lift system may be either factory-installed or provided as an after-marked accessory for vehicles, such as automobiles, pick-up trucks, SUVs, vans, or other vehicles. Additionally, an anti-theft feature is provided wherein a microcontroller, such as a microprocessor for example, is set to activate four electric motor actuators to control jack lift displacement to a pre-programmed position, such that all of the vehicle's wheels are simultaneously elevated slightly off of the ground. A vehicle with all its wheels completely elevated off the ground cannot be "driven off" the jack(s), thereby preventing or substantially deterring theft of the vehicle.

Some embodiments of the frame mounted vehicle lift system additionally comprise a spare tire dispenser located at the spare tire storage bay in vehicles wherein the spare tire is not located within an interior vehicle compartment, like the trunk. The spare tire dispenser lowers and extends the spare tire from the vehicle's spare tire storage bay, presenting the spare tire to the user in a position wherein the user simply pivots the spare from its tire mount to the ground onto its tread without lifting or substantial crouching, kneeling, or reclining.

A frame mounted vehicle lift system 100 with anti-theft features and a spare tire dispenser 150 is disclosed. Frame mounted vehicle lift system 100 employs a simple design, is very simple to use, requires substantially less user strength and skill than existing systems, and is effective in reducing the chance of injury for at least the reasons which are described herein below.

In some embodiments, frame mounted vehicle lift system 100 is installed at the factory during assembly of the vehicle. In some embodiments, frame mounted vehicle lift system 100 is installed by the vehicle user as an after-market accessory.

FIG. 1 is a perspective view of a frame mounted vehicle lift system 100 including spare tire dispenser 150. FIG. 1 shows a vehicle frame 101. Vehicle frame 101 is specific to the vehicle model on which frame mounted vehicle lift system 100 is installed. The vehicle model shown in FIG. 1 and the several other drawing figures is a pick-up truck, however this is not meant to be limiting. Frame mounted vehicle lift system 100 may be installed on all make and model of passenger and commercial vehicle frames, including automobiles, sport utility vehicles, pick-up trucks, light trucks, vans, heavy trucks, semi tractor-trailer trucks, and other vehicle models. The components of frame mounted vehicle lift system 100 are chosen to match the lift capacity necessary to safely jack the particular vehicle wheel or wheels off of the ground; accordingly, frame mounted vehicle lift system 100 installed on a heavy-duty pickup truck will comprise heavier components than frame mounted vehicle lift system 100 installed on a compact car.

A frame mounting point 104 is another component wherein the number and particular details of which depend upon the specific vehicle model. In some embodiments, including the embodiment shown in FIG. 1, vehicle frame 101 comprises four frame mounting points 104. This is not meant to be limiting. Vehicle frames 101 on other vehicles may comprise one or a plurality of frame mounting points 104, although most vehicle models comprise four frame mounting points 104 on vehicle frame 101. In embodiments with four frame mounting points 104, each frame mounting point 104 is located at a "jack-point" designated by the manufacturer. These jack points correspond to the points on a vehicle frame recommended for placement of a conventional portable jack. A frame mount 102 is located at the frame mounting points wherein a jack 106 of frame mounted vehicle lift system 100 is coupled.

Accordingly, jack 106 is coupled to frame mount 102. Generally, jack 106 will be coupled to frame mount 102 located at each frame mounting point 104 present on the vehicle, although it is possible that some embodiments will comprise frame mounts 102 present at fewer than each frame mounting point 104 and/or coupled to alternative locations on a vehicle. For example, jack 106 may be coupled to frame mount 102 located at a cross-frame member supporting the vehicle's engine, an axle, a rear-differential casing, a transmission casing, the underside of an engine block, or other suitable structure able to withstand the forces resulting from operation of jack 106 to raise the vehicle from the ground and partially support the weight of the vehicle. The aforementioned list is by way of example only and not meant to be limiting.

In some embodiments, frame mount 102 is a steel plate coupled to vehicle frame 101 by welding. In some embodiments, frame mount 102 is coupled to vehicle frame 101 using bolts or other suitable fastener. In some embodiments, another suitable method for joining steel parts sufficient to withstand the aforementioned forces generated by operation of jack 106 is used. In some embodiments, frame mount 102 is permanently coupled to frame 101, such as by welding for example. These materials and coupling means are by way of example and not meant to be limiting. An additional example is found in some embodiments of frame mounted vehicle lift system 100 wherein system 100 is provided as factory-equipment wherein frame mount 102 is created at the time of manufacture of vehicle frame 101 and is unitary with vehicle frame 101.

In the embodiment shown in FIG. 1 and the several other figures, jack 106 is a scissors jack. Jack 106, in some embodiments, may comprise a hydraulic mechanism. In some alternative embodiments, jack 106 is a mechanical "farm jack" comprising a beam with a series of equally-spaced holes along its length and a mechanism utilizing a pair or series of climbing pins. A scissors mechanism, however, has multiple advantages for use in frame mounted vehicle lift system 100. A scissors jack has a limited profile when fully retracted, allowing for compact storage beneath or alongside the vehicle's frame without substantially decreasing ground clearance while operating the vehicle. Despite this limited profile, a typical scissors jack may extend to between ten and fifteen times this size when deployed, allowing the portion of the vehicle acted on by jack 106 to be elevated clear of the ground, garage floor, or other resting surface. Jack 106 is discussed in greater detail herein below in the description of FIG. 3 and FIG. 4.

FIG. 1 also shows a spare tire dispenser 150. Spare tire dispenser 150 comprises a dispenser frame 151 and a tire mount 161. A spare tire 130 is mounted on tire mount 161 for deployment on dispenser frame 151, as shown in FIG. 1. Spare tire dispenser 150 is discussed in detail herein below, particularly under the descriptions of FIG. 6, FIG. 7, and FIG. 8.

Figure 2:
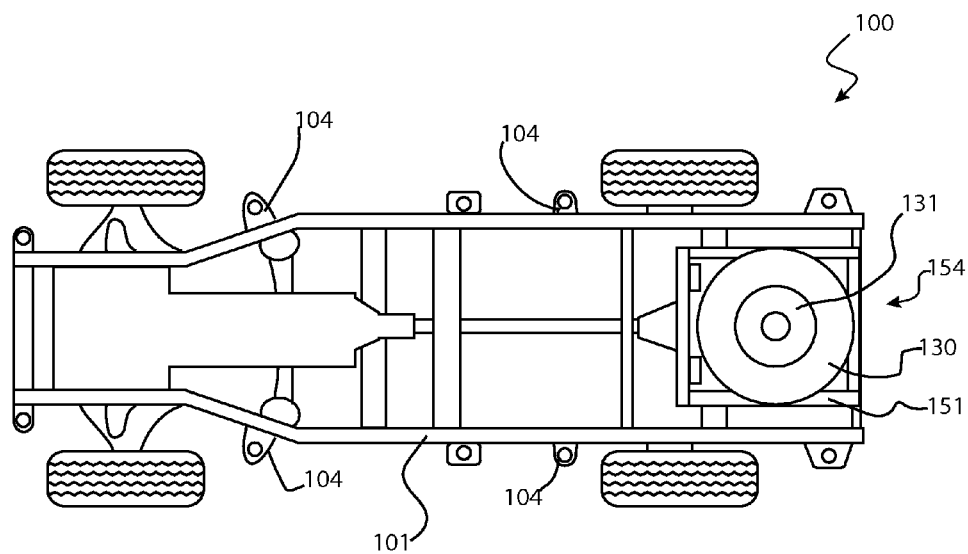
FIG. 2 is a top view of a frame mounted vehicle lift system 100 including spare tire dispenser 150 mounted on a vehicle frame with the vehicle chassis removed.

FIG. 2 is a top view of a frame mounted vehicle lift system 100, including spare tire dispenser 150, mounted on a vehicle frame with the vehicle chassis removed for clarity. A plurality of frame mounting points 104 are designated in the embodiment of the invention shown in FIG. 2, although additional possible positions on vehicle frame and elsewhere for frame mounting point(s) 104 are possible, as previously discussed. Also shown in FIG. 2 is a spare tire storage bay 154. In the embodiment shown, spare tire storage bay 154 is located underneath the chassis of the vehicle which, in this and some other embodiments, is a pick-up truck. It is typical for the manufacturers of pick-up trucks, sport utility vehicles, cargo vans, minivans, and some other vehicles to store a spare tire at the rear of the vehicle beneath the cargo bed where there is ample ground clearance and a few other vehicle structures. A pick-up truck was chosen, therefore, to illustrate the location of spare tire storage bay 154, although other locations in other vehicles are possible, according to the specific vehicle design and location in the vehicle intended by the vehicle's designing engineers for spare tire storage.

Some vehicles will not use spare tire dispenser 150. In some vehicles, spare tire storage dispenser 150 and spare tire storage bay 154 takes different forms. It is possible that certain vehicle models will not have sufficient room to locate spare tire dispenser 150 in spare tire storage bay 154. In most passenger cars, for example, the spare tire is stored in a compartment accessed through the vehicle's trunk. In some of these cars, there will be adequate room for various alternative mechanisms for spare tire dispenser 150 to dispense spare tire 130 from the trunk compartment. These alternative mechanisms are discusser further herein below. In the embodiment shown in FIG. 2 and some other embodiments, however, spare tire 130 is presented to the user by the rearward displacement of tire mount 161 of dispenser frame 151 from beneath the vehicle during operation of spare tire dispenser 150.

Figure 3:
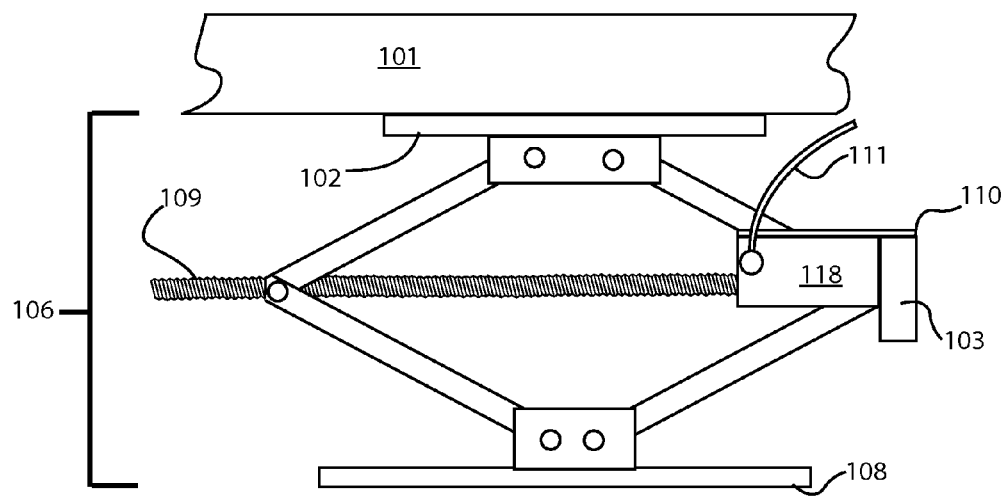
FIG. 3 is a side view of a jack 106 in a partially deployed position, mounted to a vehicle frame 101.

FIG. 3 is a side view of a jack 106 in a partially deployed position mounted to a vehicle frame 101. In the embodiment shown in FIG. 3 and some other embodiments, jack 106 utilizes a scissors-type lift mechanism. Jack 106 comprises a frame mount 102 and a lift plate 108.

Frame mount 102 is the point of attachment of jack 106 and to vehicle frame 101, as described previously herein above. Frame mount 102 is coupled directly to the lift-mechanism of jack 106 and is the structure through which this lift mechanism transfers a lifting force to vehicle frame 101. In the example shown in FIG. 3 and elsewhere in the drawing figures, the lifting mechanism is a scissors-type mechanism. The lifting mechanism of jack 106 is moved by a jack actuator 110. In the embodiment shown in FIG. 3, and some other embodiments, jack actuator 110 activates the lifting mechanism of jack 106 through a reduction coupling 103 in the embodiment shown in FIG. 3 and in some other embodiments. In some embodiments, jack actuator 110 is electrically coupled to a power source by a first wiring harness 111. In the embodiment shown in FIG. 3 and some other embodiments wherein a screw jack mechanism is used, reduction coupling 103 transfers rotational motion of jack actuator 110 to a jack screw 109, causing jack screw 109 to rotate and moving lift plate 108 away from frame mount 102. When movement of lift plate 108 causes lift plate 108 to contact the ground or other immovable surface upon which the vehicle is parked, movement of lift plate 108 ceases and movement of mounting base 108 begins, tending to move the portion of vehicle frame adjacent to frame mounting point 104 away from the immovable surface, lifting that portion of the vehicle upward.

Lift plate 108, in some embodiments, presents a generally flat planar surface to the ground and is constructed from heavy steel or other suitable material, considering the forces necessary to lift and support that portion of the vehicle. Lift plate 108 is of a size necessary to stabilize that lifted portion of the vehicle; therefore, a wide range of sizes and shapes of lift plate 108 are possible given the wide variety of sizes and weights of vehicles which may comprise embodiments of frame mounted vehicle lift system 100. In some embodiments, lift plate 108 is fixedly coupled to jack 106. In some embodiments, lift plate 108 is coupled to jack 106 on a pivoting mount, such as a ball-joint for example, wherein lift plate 108 may move in relation to the lifting mechanism of jack 106 in response to contacting an uneven of sloping ground surface. When frame mounted vehicle lift system 100 is not in use, such as when the vehicle is parked or being operated, jack 106 is in a fully retracted position and lift plate 108 is retained out-of-the-way beneath frame mounting point 104.

In some embodiments, including the example embodiment shown in the drawing figures, jack 106 is a scissors jack with a lift capacity between three and five tons. Jack 106 is operated by jack actuator 110 comprising a 12-volt electric motor. Jack actuator 110 acts upon jack screw 109 through reduction coupling 103. In this example embodiment, and some other embodiments, reduction coupling 103 provides an electric motor shaft to jack screw ration of 16:1 though mechanical gears. Any suitable reduction mechanism with a capacity to withstand the torque forces generated by jack actuator 110 needed to lift the vehicle is used.

Figure 4:
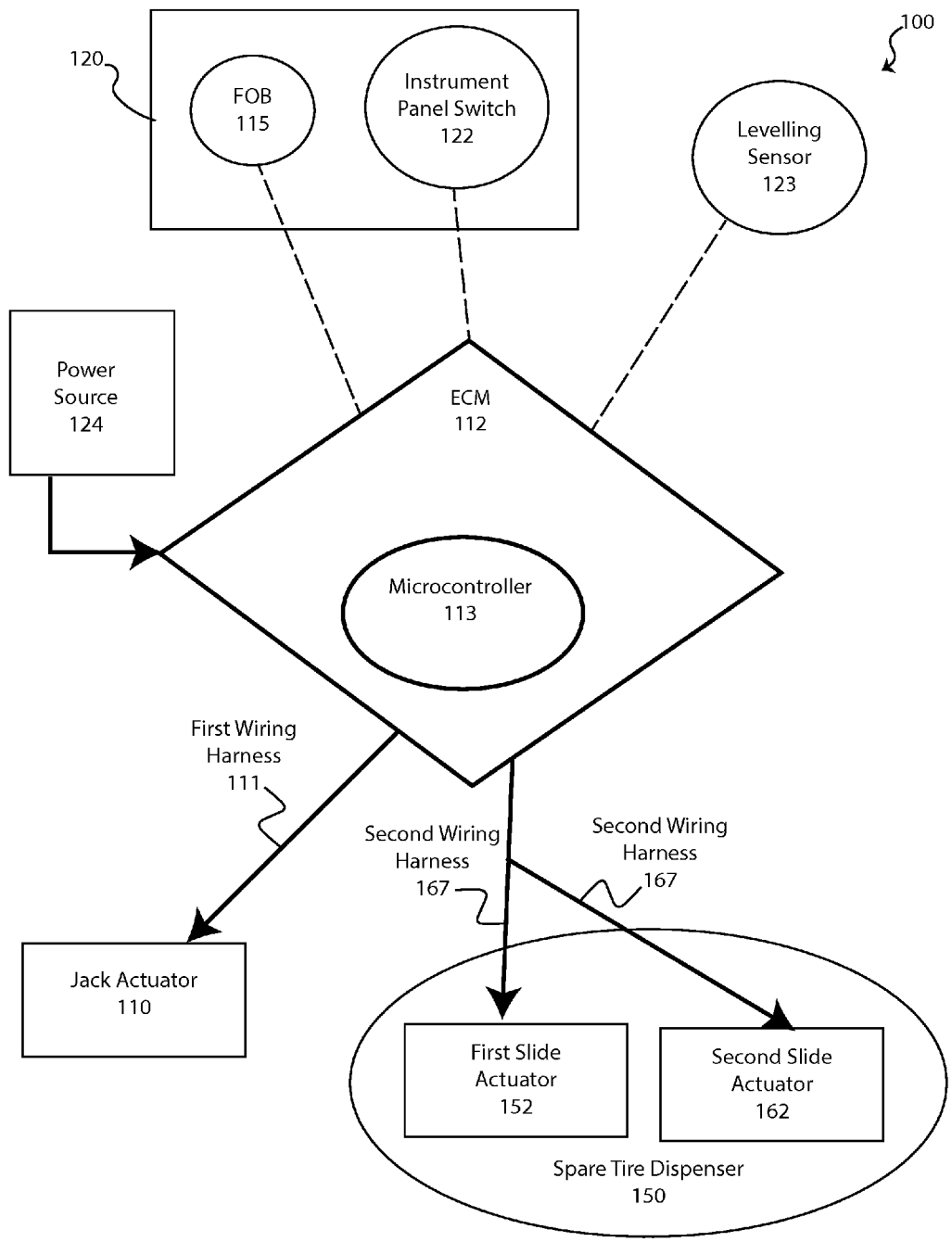
FIG. 4 is a schematic diagram depicting the control relationships between various components of a frame mounted vehicle lift system 100 including spare tire dispenser 150.

FIG. 4 is a schematic diagram depicting the control relationships between various components of a frame mounted vehicle lift system 100, including spare tire dispenser 150. Solid line arrows represent wires which carry an electrical current between the indicated electrically coupled components. Dotted line arrows represent signal transmission between the indicated components. Signals transmitted between components may be electrical currents or potential voltages transmitted by electrical couplings such as electrical wires, in some embodiments. In some embodiments, signals may be wireless signals, such as radio frequency identification (RFID) signals, for example. In some embodiments, other modes of signal transmission may be used.

Frame mounted vehicle lift system 100, including spare tire dispenser 150, is energized by a power source 124. In some embodiments, power source 124 is the vehicle's primary power source, such as the vehicle's battery for example. In some embodiments, power source 124 is a secondary battery.

Power source 124 is electrically coupled to an electronic control module ("ECM") 112 and is regulated by a microcontroller 113. In some embodiments, microcontroller 113 is a microelectronic device comprising an integrated circuit and other components, such as a memory and programmable input/output peripherals. This, however, is by example and not meant to be limiting. Microcontroller 113 may by a solid-state processor, in some embodiments. Various microelectronic and solid-state processor devices are commercially available and known to one of skill in the art of automobile electronics.

ECM 112, in some embodiments of the invention, receives a signal input from a jack actuator switch. In some embodiments, jack actuator switch is an instrument panel switch 122. In some embodiments, jack actuator switch is a finger operated button ("FOB") which activates ECM 112 via a radiofrequency or other wireless signal. In some embodiments, the signal input is from a levelling sensor 123.

Instrument panel switch 122, in some embodiments, is any solid-state or electronic switch located on the instrument panel, center console, or at any other location within the passenger compartment of the vehicle. Use of instrument panel switch 122 by an operator causes ECM 112 to close an electrical circuit between power source 124 and a component, such as jack actuator 110, a first slide actuator 152, or a second slide actuator 162 in some embodiments where any of these components are present, for example, allowing an electrical current to flow between power source 124 and the component, activating the component.

FIG. 4 also shows a second wiring harness 167. Second wiring harness 167 electrically couples ECM 112 to a first slide actuator 152 and, in some embodiments, a second slide actuator 162 of spare tire dispenser 150. Spare tire dispenser 150 generally comprises a spare tire 130 mounted to a vehicle wheel 131 (shown in FIG. 1 and FIG. 2) removeably coupled to a tire mount 161 on a dispenser frame 151. Dispenser frame 151 is housed within spare tire storage bay 154.

First slide actuator 152 causes dispenser frame 151 to move out from spare tire storage bay 154 to a position wherein the user may easily access the vehicle wheel 131/spare tire 130 without the substantial stooping and bending typically necessary with a conventional factory-provided mounting and storage system. In some embodiments of the invention, movement of dispenser frame 151 from spare tire storage bay 154 comprises a plurality of movements. For example, in the embodiment shown in FIG. 5, FIG. 6, and FIG. 7, spare tire dispenser 150 use comprises a first position 140, a second position 141, and a third position 142.

Figure 5:
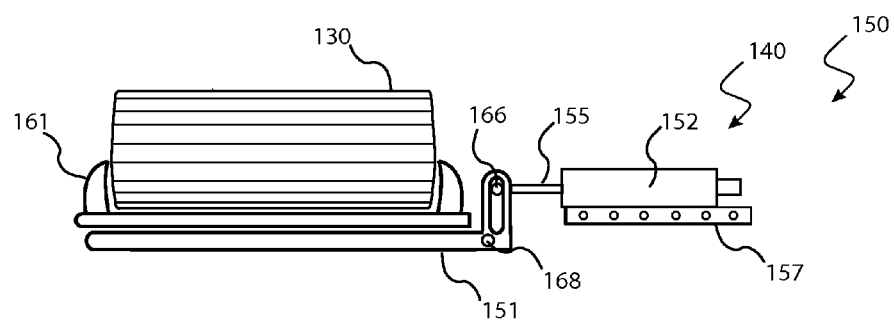
FIG. 5 is a side view of a spare tire dispenser 150 in first position 140.

FIG. 5 is a side view of a spare tire dispenser 150 in a first position 140. FIG. 5 shows spare tire 130 mounted on vehicle wheel 131 (see FIG. 1 and FIG. 2), tire mount 161 of dispenser frame 151, and a first slide actuator 152 comprising a motor and a slide bar 155 movably coupled to dispenser frame 151 by a joint 166. First position 140, as is shown by FIG. 5, comprises a position of spare tire dispenser 150 wherein the vehicle's spare tire is stowed while the vehicle is parked or being operated. First position 140 is the position from which operation of spare tire dispenser 150 is commenced in situations wherein the operator needs to access spare tire 130, such as to perform a roadside repair of a flat tire, for example. In first position 141, spare tire 130, dispenser frame 151, and tire mount 161 are all housed within the vehicle's spare tire storage bay 154 as mentioned herein above. First slide actuator 152 is coupled to a mounting member 157 on the vehicle. The nature and location of mounting member 157 are specific to the particular vehicle model whereon spare tire dispenser 150 is installed. Mounting member 157 is a structure which fixes and stabilizes first slide actuator 152. Activation of first slide actuator 152, in turn, causes first slide bar 155 to move in a linear direction away from first slide actuator 152. First slide bar 155 is coupled to dispenser frame 151 at joint 166. In the embodiment shown in FIG. 5, FIG. 6, and FIG. 7, and some other embodiments, joint 166 comprises a slidable joint wherein dispenser frame 151 pivots on first slide bar 155 at joint 166 in response to first slide actuator 152 acting upon spare tire 130 as dispenser frame 151 is moved away from the vehicle by first slide actuator 152. Dispenser frame 151 also pivots at pivot point 168 in response to extension of first slide bar 155 from first slide actuator 152.

Figure 6:
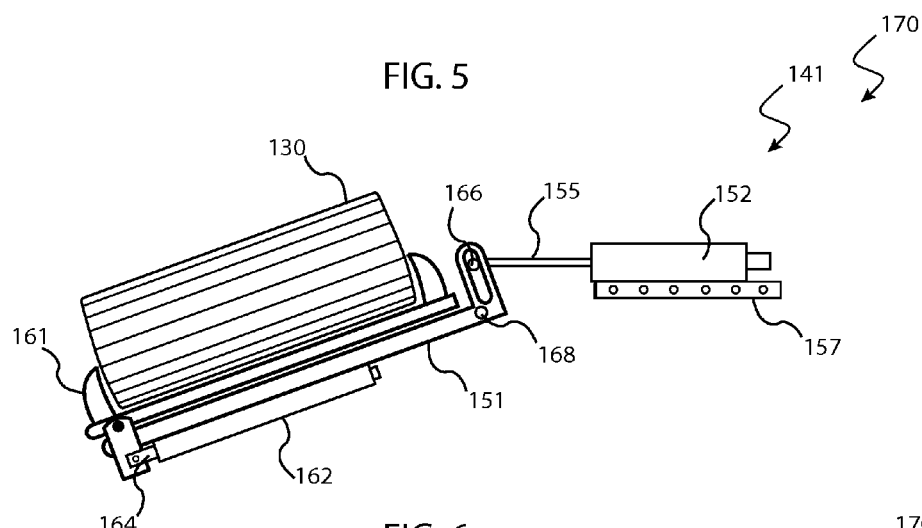
FIG. 6 is a side view of a spare tire dispenser 150 in second position 141.

FIG. 6 is a side view of a spare tire dispenser 150 in a second position 141. In the illustrated embodiment, second position 141 is a position wherein first slide actuator 152 causes dispenser frame 152 to pivot at joint 166 and rotates spare tire 130 partially out and away from spare tire storage bay 154 and the vehicle generally, but does not otherwise move dispenser frame 152 in a linear direction out from underneath the vehicle. In some embodiments, second position 141 is a position intermediate between the fully retracted, storage first position 140 shown in FIG. 5 and fully extended third position 142, discussed herein below and shown in FIG. 7. In some embodiments, second position 141 comprises dispenser frame 151 in a fully rotated position. In some embodiments further comprising a second slide actuator 162 and a second slide bar 164, such as the embodiment shown in FIG. 8 and in some other embodiments, second position 141 is an intermediate-rotated position between first fully retracted first position 140 and fully-extended third position 142. In the embodiment shown in the figures, for example, as dispenser frame 151 is moved by first slide actuator 152 via first slide bar 155, spare tire 130 is simultaneously lowered and moved from beneath the chassis of the vehicle to facilitate removal by the user.

Figure 7:
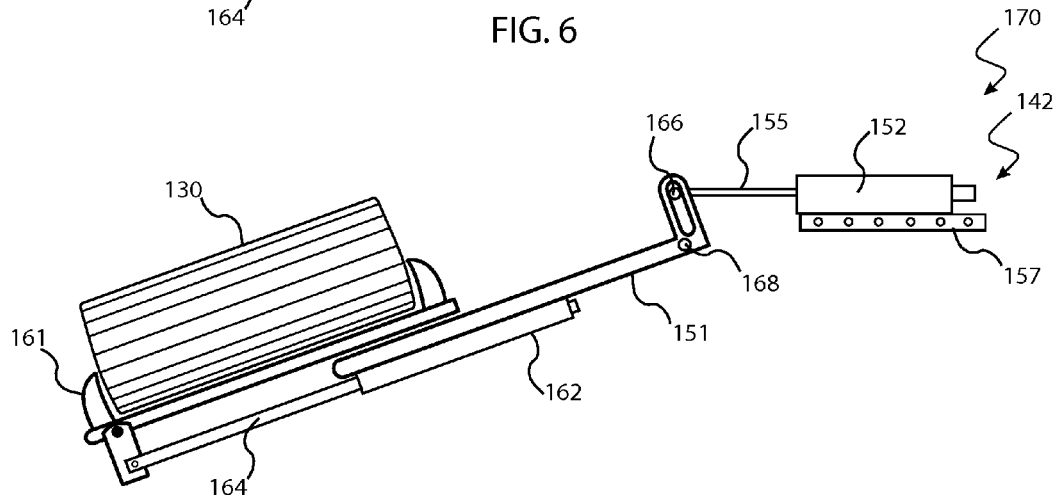
FIG. 7 is a side view of a spare tire dispenser 150 in third position 142.

FIG. 7 is a side view of a spare tire dispenser 150 in third position 142. FIG. 7 shows second slide actuator 162 coupled to tire mount 161 by second slide bar 164. In some embodiments, such as the embodiment shown in FIG. 8, tire mount 161 is slidably coupled to dispenser frame 151. In some embodiments, such as the embodiment shown in FIG. 6, for example, tire mount 161 is fixedly coupled to dispenser frame 151. Second slide actuator 162 and second slide bar 164 are not present in embodiments wherein tire mount 161 is fixedly coupled to dispenser frame 151. Conversely, however, second slide actuator 162 and second slide bar 164 may or may not be present in some embodiments wherein tire mount 161 is slidably coupled to dispenser frame 151. In some embodiments, tire mount 161 is slidably coupled to dispenser frame 151 such that gravity or a manual force applied by the user acts on spare tire 130 or an attached structure to cause tire mount 161 to slide linearly away from the vehicle along dispenser frame 151, placing dispenser frame 151 in fully extended third position 142 similar to the embodiment shown in FIG. 7.

The overall effect of the extension of first slide bar 164 from first slide actuator 152 is rotational movement at joint 166 and pivot point 168 such that dispenser frame 151 is rotated in a direction moving away from first slide actuator 152, in the embodiment shown. This example is not, however, meant to be limiting. The intended movement of dispenser frame 151 is away from the particular vehicle model's spare tire storage bay 154. Accordingly, this direction of movement depends upon the shape, depth, orientation, and position of spare tire storage bay 154 on the vehicle. In some embodiments, with installation on pick-up trucks and sport utility vehicles for example, the direction is downward. In some embodiments installed on a passenger car wherein the spare tire storage bay is accessed through the vehicle's trunk compartment, the direction is upward. In some embodiments, the direction is sideways. Additionally, some embodiments of the spare tire dispenser 150 comprise a plurality of joints 166. In some embodiments, there are additional pivot points 168. In some embodiments, extension of first slide bar 155 acts through a system of multiple joints 166 and pivot points 168 such that dispenser frame 151 is moved through a system of mechanical linkages in a configuration, such as rhombus or scissor linkages for example. Others examples are possible.

Figure 8:
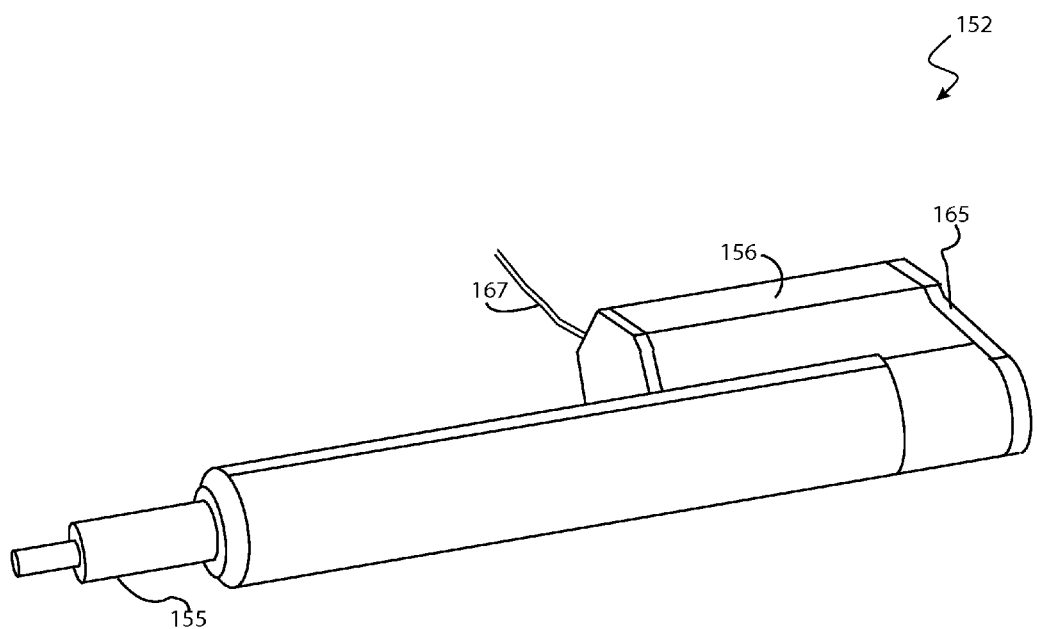
FIG. 8 is a perspective view of a first slide actuator 152.

FIG. 8 is a perspective view of first slide actuator 152. In some embodiments, first slide actuator 152 is an electric slide linear actuator which provides a force by which dispenser frame 151 is pivoted in a general direction away from the underside of the vehicle, such that the user may more easily remove spare tire 130 from tire mount 161. First slide actuator 152, in some embodiments, is a mechanical actuator and comprises a second motor 156 coupled to a ball screw (now shown) through a second reduction coupling 165. Activation of second motor 156 causes rotation of ball screw 158 via second reduction coupling 165 which, in turn, causes second slide bar 164 to move in an axial direction with respect to first slide actuator 152. The foregoing mechanism is by example only. In some embodiments, first slide actuator 152 and/or a second slide actuator 162 may comprise a hydraulic slide actuator. In some embodiments, another type of slide actuator mechanism may be used. In some embodiments, first slide actuator is absent and the user manually pivots and pulls dispenser frame 151 generally down and away from the underside of the vehicle to access spare tire 130.

Figure 9:
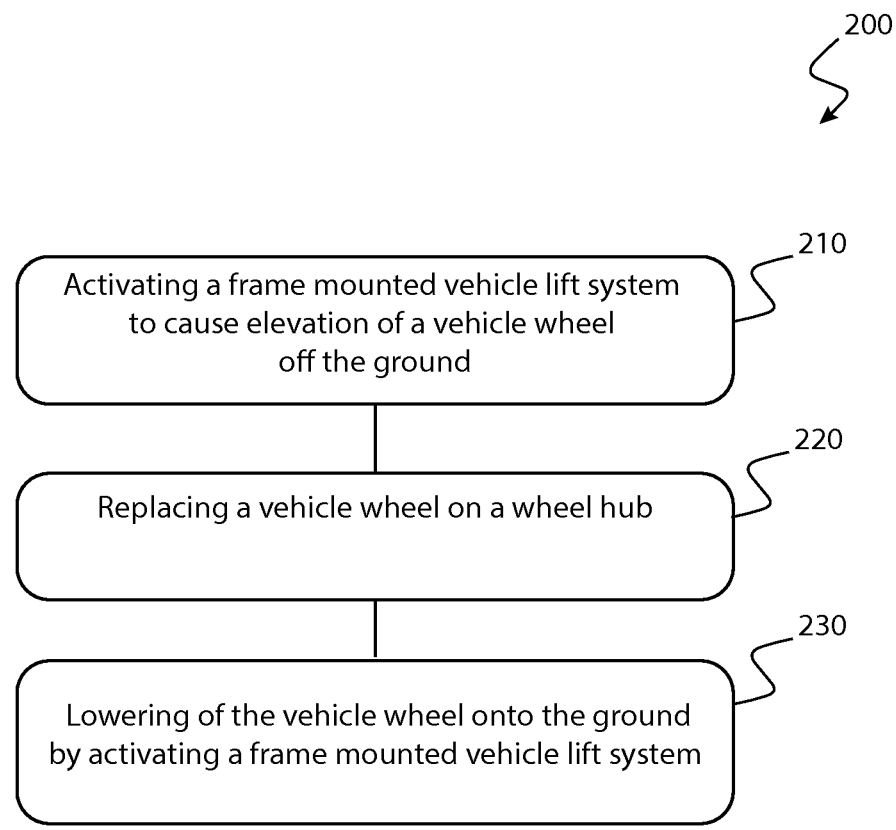
FIG. 9 is a flowchart diagramming a method 200 of changing a vehicle wheel.

FIG. 9 is a flowchart diagramming a method 200 of changing a vehicle wheel. Method 200 comprises, in some embodiments, a step 210 activating a frame mounted vehicle lift system to cause elevation of a vehicle wheel off the ground; a step 220 removing a vehicle wheel from a wheel hub; a step 230 installing a replacement wheel onto the wheel hub; a step 240 tightening lug nuts to secure the replacement wheel to the wheel hub; and a step 250 lowering of the vehicle wheel onto the ground by activating a frame mounted vehicle lift system.

Activating step 210 of method 200, in some embodiments, broadly comprises activation of a vehicle lift system, such as frame mounted vehicle lift system 100, for example, to elevate a vehicle wheel off of the ground. In some embodiments, other frame mounted vehicle lift systems may be used. In some embodiments, activation is performed when the user selects a switch located inside the vehicle, such as mechanical or electronic-touch-screen button on the instrument panel or elsewhere within the vehicle's interior. In some embodiments, activation is performed when the user selects a switch located on a FOB, such as FOB 115, for example. Other FOBs or switches located remote from the vehicle may alternatively be used, including a switch activated by a smartphone app or other computer device. In some embodiments, activation step 210 causes a single vehicle wheel to elevate off the ground. In some embodiments, activation step 210 causes more than one or all of the vehicle's wheels to be elevated off the ground.

As used throughout this document, including the aforementioned description of method 200, the term "ground" means the surface upon which the vehicle's wheels are resting when the vehicle is parked. Some non-limiting examples of "ground" include a roadway, whether paved or unpaved; an outdoor surface which is not a roadway, such as a parking lot, a concrete or asphalt slab, the ground, or some other surface; or an indoor surfaces such as a garage floor or other surface.

Removing step 220 of method 200, removing a vehicle wheel from a wheel hub, broadly comprises various sub-steps, depending upon the make and model of the vehicle. Most frequently, step 220 further comprises loosening a plurality of lug nuts from wheel-hub bolts with a wrench or similar mechanical device for loosening or tightening nuts on bolts or vice-versa. In some embodiments, step 220 comprises partially loosening the lug nuts after the vehicle wheel is partially lifted without completely ending contact between the vehicle tire and the ground. In this manner, the frame mounted vehicle lift system removes most of the vehicle's weight from the wheel hub prior to loosening the lug nuts, thus decreasing the likelihood of damaging the hub bolts while still keeping the wheel's tire in contact with the ground fixing the wheel in position so that the wheel does not rotate when the lug nuts are being loosened. Loosening and removal of the lug nuts from the hub bolts following completion of step 210 is completed following activating step 210, wherein the vehicle's wheel and tire are off the ground. After lug nuts are removed, the vehicle wheel is removed from the wheel hub, completing removing step 220.

Installing step 230 of method 200, in some embodiments, is performed by placing the replacement wheel, upon which is mounted a spare tire, onto the hub bolts and threading the lug nuts onto the hub bolts fix the replacement wheel in place.

Tightening step 240, in some embodiments, if performed by partially tightening the lug nuts on the hub bolts with a wrench or similar mechanical device. In some embodiments, the lug nuts are completely tightened while the wheel and tire remain off the ground, such as when a pneumatic impact wrench is used, for example. In some embodiments, the lug nuts are firmly tightened with a hand wrench prior to lowering step 250 and then completely tightened after lowering step 250 is partially or completely executed, such that the vehicle is partially or completely lowered with the tire making firm contact with the ground, keeping the tire from rotating as torque is applied using a wrench to fully tighten the lug nuts.

Lowering step 250 is the reverse of activating step 210, in some embodiments, wherein the frame mounted vehicle lift system is activated to fully lower the vehicle wheel onto the ground. In some embodiments, this step further comprises return of the jack elements of the frame mounted vehicle lift system to a fully-retracted, stored position against the vehicle frame, allowing for resumed vehicle operation. In some embodiments, and similar to activating step 210, a user practices lowering step 150 by selecting a mechanical button or touch-screen switch, whether solid-state or electronic, located on the vehicle's instrument panel or elsewhere in the interior of the vehicle, or on a FOB or other remote activation device such as a smartphone.

In some embodiments, method 200 further comprises

Figure 10:
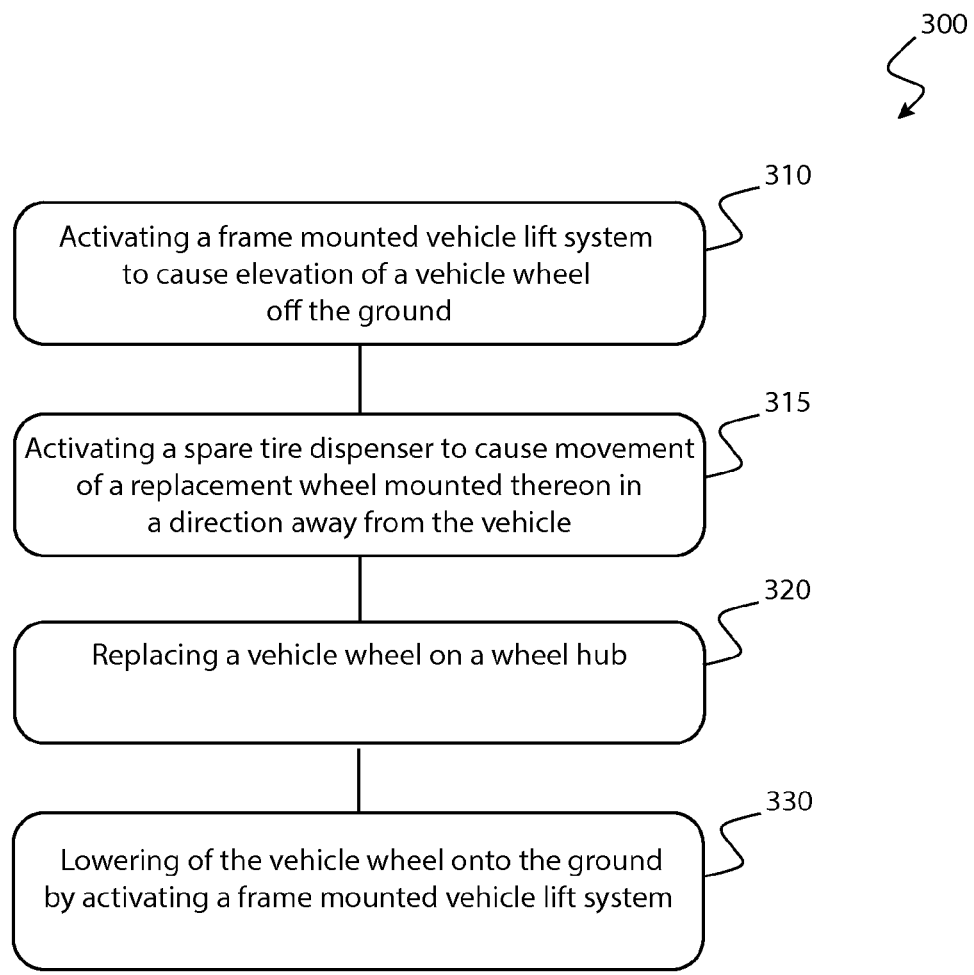
FIG. 10 is a flowchart diagramming a method 300 of changing a vehicle wheel.

FIG. 10 is a flowchart diagramming a method 300 of deterring vehicle theft. Method 300 comprises a frame mounted vehicle lift system activating step 210 a spare tire dispenser activating step 215, a removing step 220, an installing step 230, a tightening step 240, and a lowering step 250. Method 300 comprises method 200, further comprising spare tire dispenser activating step 215. A "spare tire dispenser" is any mechanical spare tire dispenser mechanism, such as spare tire dispenser 150, for example. In some embodiments, activation of spare tire dispenser is in response to the user selecting a mechanical button or touch-screen switch, whether solid-state or electronic, located on the vehicle's instrument panel or elsewhere in the interior of the vehicle, or on a FOB or other remote activation device such as a smartphone.

Figure 11:
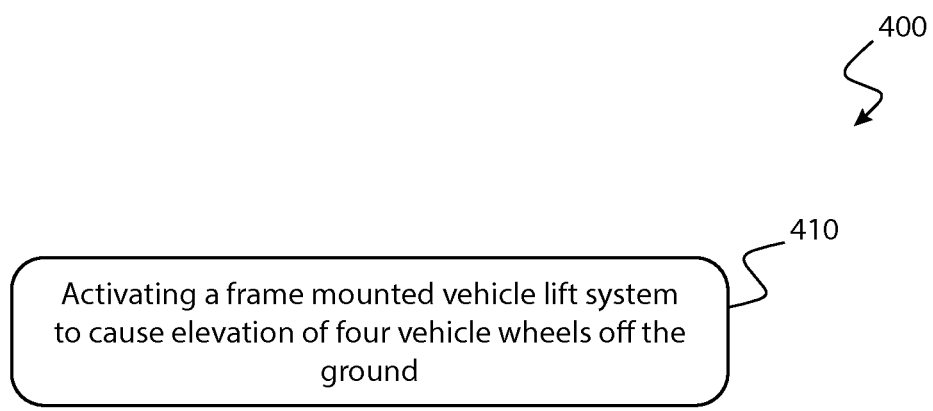
FIG. 11 is a schematic diagramming a method 400 of deterring vehicle theft.

FIG. 11 is a schematic diagramming a method 400 of deterring vehicle theft. Method 400 comprises activating step 410 wherein the user activates a frame mounted vehicle lift system to cause elevation of four vehicle wheels off the ground. To practice some embodiments of method 400, the user parks the vehicle by placing the transmission in "park" and setting the parking brake. The user then exits and locks the vehicle. Finally, the user activates the frame mounted vehicle lift system wherein multiple frame-mounted jacks extend until contacting the ground. The multiple frame-mounted jacks continue to extend until all of the vehicle's wheels no longer contact the ground. As can be appreciated, the vehicle wheels need not be elevated more than a minimal distance off the ground to prevent the vehicle from being driven off. Also, the vehicle cannot be operated on the roadway if there are four extended jacks that are securely mounted to the vehicle frame protruding from beneath the vehicle. In some embodiments, an added security feature comprises a requirement to input a password or passphrase to activate refraction of the jacks into a stored position. The vehicle must be lowered and the jacks refracted before the vehicle can be driven away. The password requirement blocks theft, even if the vehicle is left unlocked or the person attempting to steal the vehicle breaks in and "hotwires" the vehicle, because an instrument panel or other switch cannot be activated without input of the password or passphrase.

In some embodiments, activation of a frame mounted vehicle lift system is in response to the user selecting a mechanical button or touch-screen switch, whether solid-state or electronic, located on the vehicle's instrument panel or elsewhere in the interior of the vehicle, or on a FOB or other remote activation device such as a smartphone.

This invention overcomes the aforementioned and other difficulties encountered with using prior art, like the need to facilitate lifting a vehicle at the roadside and retrieve a spare tire which is relatively easy and safe, reduces the number of steps required, and which requires only minimal user strength and knowledge, for example. The widespread availability of a frame mounted vehicle lift system including spare tire dispenser enables persons unskilled in changing a flat tire, or making other necessary roadside repairs, to safely elevate one or more of a vehicles wheels from the ground. Such a lift system also provides a means to deter vehicle theft. The spare tire dispenser element reduces the physical strength and skill needed to remove a spare tire from its mounting bay in or beneath a vehicle.

Exceptional results can be obtained with the frame mounted vehicle lift system apparatus and method of use disclosed in this description of several embodiments of the invention. The vehicle lift system is inexpensive to manufacture, functionally simple, and easy to use. Thus, the disclosed method of use and various embodiments of the frame mounted vehicle lift system have immediate applicability in the automobile and transportation industries, and similarly across other applications.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A slide tire dispenser comprising:
   a dispenser frame coupled to a vehicle;
   a tire mount coupled to the dispenser frame; and
   a first slide actuator operatively coupled to the dispenser frame by a first slide bar at a slidable slot joint, and wherein activation of the first slide actuator causes the first slide bar to move in a linear direction away from the first slide actuator; and
   a pivot point coupling the dispenser frame to the vehicle, wherein activation of the first slide actuator causes the dispenser frame to pivot at the pivot point in response to the first slide actuator acting upon the dispenser frame through the first slide bar.

2. The slide tire dispenser of claim 1, wherein the first slide actuator causes a rearward displacement of a spare tire coupled to the tire mount.

3. The slide tire dispenser of claim 1, further comprising a second slide actuator operatively coupled to the dispenser frame and the tire mount, wherein the second slide actuator causes the tire mount to move in a direction away from the dispenser frame.

4. The slide tire dispenser of claim 3, wherein the second slide actuator causes the tire mount to move in a linear direction away from the dispenser frame.

* * * * *